(12) United States Patent
Hakata et al.

(10) Patent No.: US 7,863,353 B2
(45) Date of Patent: Jan. 4, 2011

(54) PAVING RESIN COMPOSITION, PAVING ASPHALT COMPOSITION, AND METHOD FOR PRODUCING PAVING ASPHALT COMPOSITION

(75) Inventors: Toshiyuki Hakata, Hiroshima (JP); Atsushi Maeda, Fukuoka (JP); Ryoma Masui, Okayama (JP)

(73) Assignee: Toda Kogyo Corporation, Hiroshima-Shi (JP)

( * ) Notice: Subject to any disclaimer, the term of this patent is extended or adjusted under 35 U.S.C. 154(b) by 319 days.

(21) Appl. No.: 10/546,607

(22) PCT Filed: Feb. 24, 2004

(86) PCT No.: PCT/JP2004/002154

§ 371 (c)(1),
(2), (4) Date: Aug. 23, 2005

(87) PCT Pub. No.: WO2004/076554

PCT Pub. Date: Sep. 10, 2004

(65) Prior Publication Data

US 2006/0089428 A1    Apr. 27, 2006

(30) Foreign Application Priority Data

Feb. 25, 2003 (JP) ............................. 2003-047026
Sep. 10, 2003 (WO) ...................... PCT/JP03/11536

(51) Int. Cl.
*C08L 95/00* (2006.01)
(52) U.S. Cl. .................... 524/59; 106/273.1; 106/275; 106/281.1; 106/284.01
(58) Field of Classification Search .................. 524/69, 524/524
See application file for complete search history.

(56) References Cited

U.S. PATENT DOCUMENTS

| | | | | |
|---|---|---|---|---|
| 3,309,329 A | | 3/1967 | Shultz et al. .............. 260/28.5 |
| 3,849,355 A | * | 11/1974 | Yamaguchi .................. 524/66 |
| 3,896,069 A | * | 7/1975 | Kosaka et al. ................. 524/68 |
| 4,008,095 A | | 2/1977 | Fukushima et al. ......... 106/235 |
| 4,248,770 A | | 2/1981 | Matsuo et al. .............. 260/104 |
| 4,320,041 A | * | 3/1982 | Abe et al. .................... 524/503 |
| 5,268,704 A | | 12/1993 | Hasegawa et al. ............ 346/1.1 |
| 5,403,117 A | * | 4/1995 | Okuyama et al. ............. 404/34 |
| 5,872,164 A | * | 2/1999 | Koide et al. ................. 523/339 |
| 5,990,206 A | | 11/1999 | Tanaka et al. ................. 524/59 |

FOREIGN PATENT DOCUMENTS

| | | |
|---|---|---|
| EP | 0340210 | 11/1989 |
| EP | 0568021 | 11/1993 |
| JP | 03-227381 | 10/1991 |
| JP | 7-157351 | 6/1995 |
| JP | 2002-537435 | 11/2002 |
| WO | WO 00/49091 | 8/2000 |

OTHER PUBLICATIONS

European Search Reports dated Mar. 3, 2006 and May 11, 2006.
International Search Report dated Jun. 29, 2004.

* cited by examiner

*Primary Examiner*—Vasu Jagannathan
*Assistant Examiner*—Doris L Lee
(74) *Attorney, Agent, or Firm*—Kratz, Quintos & Hanson, LLP

(57) ABSTRACT

Disclosed is a paving resin composition which comprises a thermoplastic resin in small lumps, containing 30 to 70% by weight of an ethylene-vinyl acetate copolymer having a vinyl acetate content of 20 to 45% by weight and a melting temperature of 40 to 100° C. The paving resin composition of the present invention is melted within a short time, excellent in wettability and adhesion property to aggregates, and capable of providing a paved face excellent in durability free from problems of deformation during summer and cracking during winter. Moreover, the paving resin composition of the present invention can be thrown directly to a mixer without being passed through a measurement apparatus and accordingly, washing work of the measurement apparatus or pipes is made unnecessary and the workability is thus significantly increased.

10 Claims, No Drawings

PAVING RESIN COMPOSITION, PAVING ASPHALT COMPOSITION, AND METHOD FOR PRODUCING PAVING ASPHALT COMPOSITION

TECHNICAL FIELD

The present invention relates to a paving resin composition, a paving asphalt composition, and a method for producing a paving asphalt composition, more particularly, to a paving resin composition excellent in storage stability, easy to be melted at the time of mixing with an aggregate, and solid at a normal temperature, a paving asphalt composition which contains the composition and is excellent in coloration and discoloration resistance of a pigment and with which the workability and work environments are improved, and a method for producing the asphalt composition.

BACKGROUND OF THE INVENTION

Recently, in a variety of cases, including a case of coloring a paving face such as a sidewalk, an open space, a bridge and the like with various colors for presenting fine appearance, a case of coloring a pedestrian crossing and a tunnel for traffic safety, or a case of coloring a crotch of a street, a bus stop, and the like for improving the function of the street, so-called color paving has been carried out.

Generally, the color paving is carried out using a colored aggregate and using a pigment for a binder.

In the case of the former, there are natural ones such as silica sand and limestone, and artificial ones such as so-called light color aggregate available. They are all white and many of them are expensive.

On the other hand, with respect to the latter, there is a method for mixing a pigment to a heated asphalt mixture, however, the heated asphalt itself is originally dark brown and even if a pigment is added, it is difficult to provide the chromaticity or brightness of the pigment itself.

To solve the above-mentioned problems, there is a method for mixing a synthetic resin such as a petroleum type resin and an epoxy resin with a pigment. This method can make color paving with various light colors possible, however, it requires washing of facilities in the case of using existing asphalt facilities and inevitably involves complicated work and also it is required to transport the asphalt mixture in heated and melted state to a work site and therefore, it is needed to transport the mixture in a large quantity on a lorry to inevitably result in cost up in the case of a small scale paving. Moreover, in the case of mixing a pigment with a mixer, the pigment in fine powder state is scattered to the ambient environments to cause various problems, for example, adverse effects on workers or worsening of working environments.

To solve such problems, Japanese Patent Application Laid-Open (JP-A) No. 51-49532 reports cobble stone size or flaky molded bodies containing thermoplastic resins such as natural modified rosin resins and rosin polyesters, which are solid at a normal temperature, epoxy resins, and color pigments such as extender pigments. However, they are not used for paving after being mixed with aggregates, but at first the resin composition is heated, melted and used for paving, and then aggregates are spread and therefore, there occurs a problem in adhesion of the aggregates and the resin composition.

Japanese Patent No. 2,516,445 reports a granular or small lump type asphalt admixture containing commercialized asphalt as a thermoplastic resin and inorganic coloration pigment powders. However, the thermoplastic resin used here is a resin composition commercialized for so-called color paving and it is half-solid state itself at a normal temperature, the asphalt admixture is only a mixture obtained by mixing the commercialized asphalt and the pigments and crushing the mixture to certain sizes and therefore, there is a problem that the crushed particles of the admixture are stuck to one another at a normal temperature, especially in summer time.

Further, in the case the temperature is decreased at the time of a paving work, the fluidity of the asphalt composition is worsened to result in a possible problem in difficulty of a spreading and leveling work.

To prevent adhesion, Japanese Patent No. 2,562,094 reports a granular asphalt obtained by mixing a water suspension of sulfates, silicates, carbonates, hydroxides, and oxides of alkaline earth metals and zinc with commercialized asphalt and granulating and drying the mixture. The characteristic of this technique is that the above-mentioned fine powders are used as so-called suspension stabilizer so as to suspend asphalt, which is an oil component, in water and the use amount of the powders is consequently so high as to be 10 to 200 parts based on the amount of asphalt and since the fine powders contain a large quantity of water, there occurs a foaming problem at the time of producing an admixture by mixing the granular asphalt with aggregates and further it results in a problem that the work is dangerous and takes a long time.

Further, Japanese Patent Application Publication (JP-B) No. 58-10435 reports mixtures containing thermoplastic resins such as petroleum resins, petroleum type plasticizers with 200 or higher average molecular weight, and 0.1 to 5 parts by weight of vinyl acetate-ethylene copolymers. However, there is no description of the size and morphology of the obtained resin compositions and all of the compositions have a softening point of 45° C. or lower and are in semi-solid state at a normal temperature and at the time of using them, the compositions require to be heated and melted previously in a lorry vehicle or the like and their handling and workability is thus problematic.

Japanese Patent Application Laid-Open (JP-A) No. 62-189203 reports mixtures obtained by mixing 3 to 20 parts by weight of rubber type thermoplastic high molecular weight polymers (C component) and 0.3 to 15 parts by weight of urethane polymers (D component) of diene type liquid rubbers to mixtures of thermoplastic resins (A component) such as petroleum resins and petroleum type process oils (B component). However, the softening points of these resin compositions are all as low as 30 to 50° C. and as described above, the mixtures are in semi-solid state at a normal temperature to result in handling problems.

Further, Japanese Patent Application Laid-Open (JP-A) No. 4-359063 reports color paving binder compositions obtained by mixing 2 to 6 parts by weight of styrene-butadiene-styrene resins, 2 to 6 parts by weight of ethyl acrylate, ethylene ethyl acrylate, or ethylene vinyl acetate based on 100 parts by weight of base materials containing aromatic process oils and dicyclopentadiene type petroleum resins. However, there is no description of the morphology of the obtained binder compositions and further, oil type liquid substances exist in a ratio of 50% or more in the entire resin compositions and the obtained resin compositions are also in semi-solid state to result in a problem of handling difficulty. Further, basically, to produce admixtures, it is needed to feed the compositions to a mixer after the compositions are previously heated and melted by a lorry vehicle or the like and thus there is also a problem of workability.

Japanese Patent No. 2,688,447 reports color paving binder compositions which indispensably contain petroleum resins, aromatic heavy mineral oils, thermoplastic elastomers, and liquid maleated organic compounds having an average molecular weight of 300 to 10,000 and an acid value of 10 to 200. Although there is description that an ethylene-vinyl acetate copolymer and the like may be added as the thermoplastic elastomers, the use amount is a little and oil type liquid substances exist in a ratio of 50% or more in the entire resin compositions and the obtained resin compositions are also in semi-solid state having a softening point of 50° C. or below to result in a problem of handling difficulty, similarly as described above. Further, there is no description of the morphology of the color paving binder compositions at all.

The Japanese Patent Application Publication (JP-B) No. 49-15469 reports a method for mixing plasticizers and pigments, based on necessity, with heated mixtures of polyethylene waste products and 20 to 40% of petroleum resins on the basis of polyethylene. However, the method is insufficient in fusion and wettability to aggregates and also in strength of mixtures with aggregates to result in a problem of durability of a paved face.

In view of the above situation, it is an object of the present invention to provide a paving resin composition in small lumps which is melted within a short time, excellent in wettability and adhesion property to aggregates, and capable of providing a paved face excellent in durability and free from problems of deformation during summer and cracking during winter.

Another object of the present invention is to provide a paving resin composition in small lumps, containing a pigment and a specified thermoplastic resin composition, which does not cause any powder dust generation problem even in work sites, and is suitable for paving while being mixed with aggregates within a short time.

Further, other object of the present invention is to provide a paving asphalt composition which is free from discoloration with lapse of time and easy to be spread and leveled in paving work ground.

DISCLOSURE OF THE INVENTION

The inventors of the present invention have made various investigations to solve the above-mentioned problems and consequently have found that the problems could be solved by a thermoplastic resin composition in small lumps containing a specified amount of a specified ethylene-vinyl acetate copolymer, thus have completed the present invention.

That is, the present invention according to the first aspect provides a paving resin composition which comprises a thermoplastic resin composition in small lumps, containing 30 to 70% by weight of an ethylene-vinyl acetate copolymer having a vinyl acetate content of 20 to 45% by weight and a melting temperature of 40 to 100° C.

The present invention according to the second aspect provides the paving resin composition of the first aspect, wherein the thermoplastic resin composition contains 30 to 70% by weight of an ethylene-vinyl acetate copolymer having a vinyl acetate content of 20 to 45% by weight and a melting temperature of 40 to 100° C., and 30 to 70% by weight in total of other thermoplastic resins and a viscosity adjustment agent in which the viscosity adjustment agent is in an amount of at highest 25% by weight.

The present invention according to the third aspect provides the paving resin composition of the second aspect, wherein the other thermoplastic resins are petroleum type resins.

The present invention according to the fourth aspect provides the paving resin composition of the second or third aspect, wherein the viscosity adjustment agent is at least one substance selected from process oils, liquid rubbers, epoxy resins, rosins, and low density polyethylenes.

The present invention according to the fifth aspect provides the paving resin composition of any one of the first to fourth, wherein the ethylene-vinyl acetate copolymer has a melt flow rate of 50 to 3,000 g/10 min.

The present invention according to the sixth aspect provides the paving resin composition of any one of the first to fifth aspect which further contains 5 to 50 parts by weight of a pigment based on 100 parts by weight of the thermoplastic resin composition.

The present invention according to the seventh aspect provides the paving resin composition of any one of the first to sixth aspect, wherein the size of the small lumps is 2 to 30 mm as an average value of the maximum diameter.

The present invention according to the eighth aspect provides a paving asphalt composition which contains 3 to 10% by weight of the paving resin composition of any one of the first to seventh aspect and 97 to 90% by weight of an aggregate.

The present invention according to the ninth aspect provides the paving asphalt composition of the eighth aspect, obtained by mixing the paving resin composition and the aggregate at 150 to 200° C.

The present invention according to the tenth aspect provides a method for producing a paving asphalt composition of the eighth or ninth aspect which comprises the steps of:

directly throwing the paving resin composition to a mixer without passing through a measuring apparatus, and carrying out mixing at 150 to 200° C.

The present invention according to the eleventh aspect provides the method for producing a paving asphalt composition of the tenth aspect, previously heating the aggregate at 160 to 220° C.

BEST MODES OF THE CARRYING OUT THE INVENTION

The constitutions of the present invention will be described in more detail below.

The ethylene-vinyl acetate copolymer in the present invention has a vinyl acetate content of 20 to 45% by weight and preferably 28 to 45% by weight.

If the content of vinyl acetate is less than 20% by weight, the flexibility of the obtained thermoplastic resin composition becomes insufficient and in the case of paving using a paving resin composition obtained by forming the composition into small lumps, it results in occurrence of cracks in the paved face and this phenomenon becomes significant particularly in winter seasons.

On the other hand, if the content of vinyl acetate exceeds 45% by weight, the melting property is worsened and the wettability of aggregate becomes insufficient, and in the case of paving using a paving resin composition obtained by forming the composition into small lumps, it results in occurrence of cracks in the paved face.

The melting temperature of the ethylene-vinyl acetate copolymer is 40 to 100° C. and preferably 50 to 90° C.

If the melting temperature is lower than 40° C., the obtained thermoplastic resin composition becomes sticky and is thus impossible to be formed into the desired small lumps.

On the other hand, if the melting temperature exceeds 100° C., the temperature for melting the composition and mixing the composition with the aggregate is required to be high and the time takes long, resulting in a problem of workability.

Further, the melt flow rate of the ethylene-vinyl acetate is preferably 50 to 3,000 g/10 min and further preferably 60 to 2,200 g/10 min.

If the melt flow rate is lower than 50 g/10 min, the temperature for melting the composition and mixing the composition with the aggregate is required to be high and the time takes long, resulting in a problem of workability in some cases.

On the other hand, the melt flow rate exceeds 3,000 g/10 min, it may result in occurrence of cracks in the paved face.

In the present invention, as other thermoplastic resins to be used together with the ethylene-vinyl acetate copolymer, petroleum type resins are preferable. As the petroleum type resins, those having a softening point of 70 to 150° C. are preferable and those having a softening point of 70 to 120° C. are more preferable.

If the softening point is lower than 70° C., the obtained thermoplastic resin composition becomes sticky and thus it sometimes becomes difficult to make the composition into the desired small lumps.

On the other hand, if the softening point exceeds 150° C., the temperature for melting the composition and mixing the composition with the aggregate is required to be high and the time takes long, resulting in a problem of workability in some cases.

The melt viscosity of the petroleum type resins is preferably in a range of 100 to 1,000 cps and more preferably in a range of 100 to 800 cps at 160° C.

If the melt viscosity is lower than 100 cps, there may occur a problem in durability of the paved street face.

On the other hand, if the melt viscosity exceeds 1,000 cps, the wettability and adhesion property to the aggregate is inferior and there may occur a problem in durability of the paved street face.

Also, as the petroleum type resins, aliphatic type resins produced from C5 fractions, aromatic type resins produced from C9 fractions, or C5C9 copolymer type petroleum resins produced from both, and cyclopentadiene type petroleum resins can be used. They may be used alone or in combination of two or more, based on the necessity.

Further, as other additives, viscosity adjustment agents of petroleum type process oils and liquid rubbers, epoxy resins, rosins, and low density polyethylenes and the like may be used alone or in combination of two or more, based on the necessity. Addition of them improves the viscosity of the thermoplastic resin composition and wettability to the aggregate.

As the petroleum type process oils, those having a flash point of 260° C. or higher are preferable. Practically, lubricating oils and heavy mineral oils and the like may be used.

As the liquid rubbers, terpene type polymers, liquid polybutadiene, and liquid polybutene and the like may be used.

In the paving resin composition of the present invention, the content of the ethylene-vinyl acetate copolymer is 30 to 70% by weight and preferably 30 to 60% by weight.

If the content of the ethylene-vinyl acetate copolymer is less than 30% by weight, the flexibility of the thermoplastic resin composition becomes insufficient and accordingly, it may result in occurrence of cracks in the paved face and this problem particularly becomes significant in winter seasons.

On the other hand, if it exceeds 70% by weight, the wettability to the aggregate becomes insufficient and the adhesion property to the aggregate becomes problematic. Further, the compatibility with petroleum type resins is also deteriorated to make it impossible to carry out street paving excellent in durability.

The content in total of other thermoplastic resins and viscosity adjustment agent is 30 to 70% by weight and preferably 40 to 70% by weight. However, the content of the viscosity adjustment agent in the total amount is at highest 25% by weight, that is, 0 to 25% by weight and preferably 2 to 25% by weight.

If the content in total of other thermoplastic resins and viscosity adjustment agent is less than 30% by weight, the melting property as the resin composition becomes insufficient in some cases and on the other hand, if it exceeds 70% by weight, the flexibility as the resin composition becomes insufficient and accordingly, it may result in occurrence of cracks in the paved face.

If the content of the viscosity adjustment agent exceeds 25% by weight, the obtained thermoplastic resin composition becomes sticky and is thus impossible to be formed into small lumps, or the small lumps are stuck to each other with lapse of time, or the wettability and adhesion property to the aggregate is worsened and there may occur a problem in durability of the paved street face in some cases.

In the present invention, a pigment may be used, based on the necessity. The pigment may be inorganic pigments or organic pigments. Especially, in terms of the heat resistance and weathering resistance, the inorganic pigments are preferable.

As the inorganic pigments, hydrated yellow iron oxide (goethite), red iron oxide (rouge), green chromium oxide, white titanium oxide and the like can be employed. A pigment having improved heat resistance can also be employed. Further, extender pigments such as calcium carbonate, talc, clay and the like can be used. Two or more of these pigments may be used in combination.

Use of magnetic particles such as ferrites provides a function based on the magnetism such as magnetic induction.

The content of the pigments is generally 5 to 50 parts by weight to 100 parts by weight of the thermoplastic resin composition. If it is less than 5 parts by weight, the effect of addition of the pigment becomes insufficient and on the other hand, if it exceeds 50 parts by weight, the wettability to the aggregate becomes insufficient to result in occurrence of a problem in adhesion to the aggregate.

To further prevent adhesion of a paving resin composition in small lumps, the above-mentioned inorganic pigments, or economical minerals such as calcium carbonate, clay, talc, silica sand, and bentonite, or lubricants such as magnesium stearate, calcium stearate and barium stearate may be added. One or more of these powders for adhesion prevention may be used in combination. To be more effective, the powders may be stuck to the surface of the obtained paving resin composition in small lumps and for example, the powders may be sprayed on strands coming out of an extruder and then the strands are formed into small lumps with a desired size or the paving resin composition is formed into small lumps and coated with the powders.

The addition amount of these powders for adhesion prevention is generally 0.1 to 5 parts by weight based on 100 parts by weight of the thermoplastic resin composition.

In the case of pigments, there is no problem, however in the case of using the lubricants, the use amount is preferable to be as low as possible. Accordingly, it is preferably 5 parts by weight or less. On the other hand, if it is less than 0.1 part by weight, the addition effect cannot be sufficient.

A thermoplastic resin composition containing an ethylene-vinyl acetate copolymer, preferably a thermoplastic resin composition containing the polymer and a petroleum type resin, or a thermoplastic resin composition further containing other additives at respectively prescribed ratios, based on the necessity, is heated and kneaded at 100 to 180° C. to thus obtain a paving resin composition. Industrially, the composition is kneaded by a uniaxial or biaxial extruder, cooled and crushed by a pelletizer into desired size to obtain the paving resin composition in small lumps of the present invention.

In the case of mixing with a pigment, prescribed resins and the pigment are mixed by a mixer such as a Henshel mixer, a V-type blender or the like before they are led to an extruder, then they are subjected to the respective treatments of kneading, cooling, and crushing to obtain the paving resin composition in small lumps of the present invention.

The size of the small lumps is preferably about 2 to 30 mm as an average value of the maximum diameter.

If it is smaller than 2 mm, adhesion of the paving resin composition itself tends to occur easily during storage and on the other hand, if it exceeds 30 mm, in the case of producing an admixture by mixing the composition with an aggregate, it tends to cause a problem that the melting work takes a long time.

The paving resin composition obtained in such the above manner is wrapped in poly bags of 5 Kg or 10 Kg capacity. Accordingly, at the time of preparing a paving asphalt composition as described below, the composition may directly be fed to a mixer from the wrapped state without the passage of a measurement apparatus and thus the measurement can be carried out simultaneously with feeding and the workability is remarkably improved.

A paving asphalt composition according to the present invention contains 3 to 10% by weight of the above-mentioned paving resin composition and 97 to 90% by weight of an aggregate. If the amount of the paving resin composition is less than 3% by weight, the strength of the paving asphalt composition is weak and cracking or the like tends to occur. On the other hand, if it exceeds 10% by weight, rutting of the paved face tends to easily occur during summer time.

A preferable preparation method of the paving asphalt composition is a method carried out by directly throwing the paving resin composition in wrapped state to a mixer without passing the paving resin composition through a measurement apparatus and mixing the composition with an aggregate at 150 to 200° C., more preferably 150 to 180° C. If the temperature is lower than 150° C., the workability in the case of laying the obtained asphalt composition may possibly be decreased and on the other hand, if it exceeds 200° C., there may occur a problem that the resin is partially deteriorated and the pigment is discolored. The mixing time is about 30 to 60 seconds. If it is shorter than 30 seconds, the mixing may be insufficient and on the other hand, even if it exceeds 60 seconds, the effect is not so much changed and the workability is rather deteriorated. In this case, the aggregate may be heated previously at 160 to 220° C. and then thrown to the mixer, so that the paving resin composition can be melted within a short time and the aggregate can sufficiently be wetted. If it is lower than 160° C. or exceeds 220° C., it becomes difficult to adjust the temperature to the above-mentioned preferable mixing temperature.

In the case the paving resin composition contains a pigment, it is not necessary to add only the pigment to the mixer and accordingly, no undesirable effects on health and environments attributed to the powder dust of the pigment may be caused and therefore it is preferable to use the pigment-containing paving resin composition.

As described above, the important points of the paving resin composition of the present invention are as follows. That is, the paving resin composition containing at least the specified ethylene-vinyl acetate copolymer is made to be in small lumps so as to prevent adhesion of the lumps one another during storage or transportation and sticking of the lumps to a mixer and to melt them within a short time.

Moreover, the addition ratio of the specified ethylene-vinyl acetate copolymer is controlled to be 30 to 70% by weight, so that the composition can be melted within a short time, excellent in wettability and adhesion property to the aggregate, and thus capable of providing paved face having excellent durability and free from deformation during summer and cracking during winter.

Further, the paving resin composition in the small lumps of the present invention can be wrapped in a poly bag with a prescribed capacity, so that the composition can be thrown directly to a mixer from the wrapped state and simultaneously weighed withour being passed through a measurement apparatus and accordingly, washing work of the measurement apparatus or pipes is made unnecessary and the workability is increased.

Further, with respect to the resin composition containing a pigment, the pigment is not necessary to add separately to the mixer, so that the paving resin composition free from a problem on health and environments attributed to powder dust and the composition having good workability can be provided.

Hereinafter, the present invention will be described in more detail along with Examples and Comparative Examples, however, the present invention is in no way limited thereby.

In the following description, "%" and "part" mean "% by weight" and "part by weight" respectively, unless otherwise specified.

Evaluation of the paving resin composition was carried out according to methods described in "Petroleum Asphalt" JIS K2207 and the respective items of softening point, penetration degree, elongation, and melting property were measured.

According to the following standards, the melting property was evaluated based on how long it took to entirely melt each paving resin composition 5 g when the composition was heated on an aluminum foil by a hot plate at 130° C.

<3 minutes: ○, 3 to 5 minutes: Δ, and

>5 minutes: ×.

The adhesion property of each paving resin composition was evaluated by investigating the adhesion state of the small lumps after the paving resin composition 100 g was left for 1 week in a thermostat at 30° C.

The adhesion amount of the small lumps was less than 1/10: ○,

The adhesion amount of the small lumps was 1/10 to less than 1/2: Δ, and

The adhesion amount of the small lumps was 1/2 or more: ×.

According to the following standards, the low temperature property was evaluated based on whether the paving resin composition could be broken by hand or not after each paving resin composition 5 g was heated and melted on an aluminum foil by a hot plate at 130° C. and left for one night in a low temperature warehouse at 5° C.

not broken: ○, not broken but cracked: Δ, and broken: ×.

With respect to the paving asphalt compositions containing aggregates, evaluation was carried out by Marshall Stability Test and Immersion Marshall Stability Test.

The Marshall Stability Test was carried according to the method described in "Paving Testing Handbook", published by Japan Road Association, in November 1986.

The preparation conditions of test specimens were as follows.

Each mixture containing an aggregate and each resin composition obtained in Examples and Comparative Examples was mixed at 150 to 160° C. and compacted at 130 to 140° C. The number of the times of compaction was 50 times in both faces.

Each specimen obtained in the above-mentioned preparation conditions was subjected to the Marshall Stability Test as it was and additionally, the specimen was subjected to the Marshall Stability Test after immersion in a thermostat water tank at 60° C. for 48 hours.

The residual stability was calculated according to the following equation.

The residual stability (%)=[stability after 60° C.-48 hour immersion in water/stability before immersion in water]×100.

EXAMPLE 1

Ultrathene 760 (Trade name: manufactured by Tosoh Corporation, vinyl acetate content 42%, melting temperature 48° C., melt flow rate 70 g/10 min)525 g as an ethylene-vinyl acetate copolymer, Neopolymer E100 (Trade name: manufactured by Nippon Petrochemcials Co., Ltd.: softening point 90° C., melt viscosity 200 cps)750 g as a petroleum type resin, and AROMAX-4 (Trade name: manufactured by Fuji Kosan Co., Ltd.) 225 g as a process oil were mixed by a mixer and heated at 120° C. to melt the mixture and the mixture was kneaded by a biaxial extruder and the extruded mixture was cooled and cut into small lumps with φ4 mm ×5 mm to obtain a paving resin composition (A).

The main production conditions and properties are shown in Table 1 and Table 2, respectively, and the obtained paving resin composition (A) was found having a softening point of 68.0° C., penetration degree 40, and elongation 52 cm.

EXAMPLES 2 TO 10 AND COMPARATIVE EXAMPLES 1 TO 5

The paving resin compositions (B) to (O) were produced in the same manner as in Example 1, except the type and the amount of the ethylene-vinyl acetate copolymer, the type and the amount of the petroleum type resin, the type and the amount of the additive, and the size of the small lumps were changed variously and the main production conditions and properties are shown in Table 1 and Table 2, respectively.

The trade names of the products and the names of the makers of the product to be used in Examples 2 to 10 and Comparative Examples 1 to 5 are as follows.

(Ethylene-Vinyl Acetate Copolymers)
Ultrathene 735: manufactured by Tosoh Corporation.
Ultrathene 726: manufactured by Tosoh Corporation.
Ultrathene 725: manufactured by Tosoh Corporation.
Ultrathene 727: manufactured by Tosoh Corporation.
Ultrathene 633: manufactured by Tosoh Corporation.
Ultrathene 515: manufactured by Tosoh Corporation.
Sumitate KF-11: manufactured by Sumitomo Chemical Co., Ltd.,
Sumitate MB-11: manufactured by Sumitomo Chemical Co., Ltd.,
Sumitate RB-11: manufactured by Sumitomo Chemical Co., Ltd.,
Evaflex 40W: manufactured by Du-Pont Mitsui Polychemicals Co., Ltd.,
Evaflex EV45X: manufactured by Du-Pont Mitsui Polychemicals Co., Ltd., (Petroleum Type Resin)
Neopolymer-E100: manufactured by Nippon Petrochemicals Co., Ltd.,
Neopolymer-S: manufactured by Nippon Petrochemicals Co., Ltd.,
Petrotak 70: manufactured by Tosoh Corporation.
Petcoal LX: manufactured by Tosoh Corporation.
YS Resin T085: manufactured by Yasuhara Chemical Co., Ltd.,
Arkon P-70: manufactured by Arakawa Chemical Industries Ltd.,
Marukarez M-905A: manufactured by Maruzen Petrochemical Co., Ltd.,
Marukarez H-700F: manufactured by Maruzen Petrochemical Co., Ltd., (Viscosity Adjustment Agent)
Process oil: Diana Oil AH-24: manufactured by Idemitsu Kosan Co., Ltd.,
Liquid rubber: Polybutadiene R-15HT: manufactured by Idemitsu Kosan Co., Ltd.,
Process oil: AROMAX-3: manufactured by Fuji Kosan Co., Ltd.,
Process oil AROMAX-5: manufactured by Fuji Kosan Co., Ltd.,
Epoxy resin: Epichlon 1050: manufactured by Dainippon Ink and Chemicals Inc.,
Rosin: manufactured by Arakawa Chemical Industries, Ltd., and
Low density polyethylene: Petrothene 225: manufactured by Tosoh Corporation.

TABLE 1

| | Paving resin composition | | | | | | | |
|---|---|---|---|---|---|---|---|---|
| | Ethylene-vinyl acetate copolymer | | | | | | Petroleum type resin | |
| Examples and Comp. Examples | Trade name | Vinyl acetate content (wt. %) | Melting temperature (° C.) | Melt flow rate (g/10 min) | Amount (g) | Content (%) | Trade name | Softening point (° C.) |
| Ex. 1 | Ultrathene 760 | 42 | 48 | 70 | 525 | 35 | Neopolymer-E100 | 90 |
| Ex. 2 | Sumitate KF-11 | 28 | 64 | 450 | 550 | 37 | Petrotak 70 | 70 |
| Ex. 3 | Ultrathene 735 | 28 | 69 | 1000 | 600 | 40 | Neopolymer-E100 | 90 |
| | | | | | | | Marukarez M-905A | 105 |
| Ex. 4 | Ultrathene 726 | 31 | 54 | 700 | 600 | 40 | Petrotak 70 | 70 |
| Ex. 5 | Sumitate MB-11 | 32 | 63 | 60 | 600 | 40 | Arkon P-70 | 70 |
| Ex. 6 | Sumitate RB-11 | 41 | 63 | 60 | 570 | 38 | Marukarez H-700F | 95 |
| Ex. 7 | Ultrathene 725 | 28 | 62 | 1000 | 600 | 40 | Neopolymer-E100 | 90 |
| Ex. 8 | Ultrathene 727 | 28 | 52 | 2200 | 500 | 34 | Petrotak 70 | 70 |

TABLE 1-continued

|  |  |  |  |  |  |  |  | YS Resin T085 | 85 |
|---|---|---|---|---|---|---|---|---|---|
| Ex. 9 | Evaflex 40W | 41 | 40 | 65 | 550 | 37 | Petrotak 70 | 70 |
| Ex. 10 | Ultrathene 633 | 20 | 83 | 20 | 600 | 40 | Petrotak 70 | 70 |
| Comp. Ex. 1 | Ultrathene 515 | 6 | 101 | 2.5 | 500 | 33 | Neopolymer-S | 95 |
| Comp. Ex. 2 | — | — | — | — | — | — | Petcoal LX | 98 |
| Comp. Ex. 3 | Evaflex EV45X | 46 | <40 | 100 | 600 | 40 | Neopolymer-S | 95 |
| Comp. Ex. 4 | Ultrathene 760 | 42 | 48 | 70 | 1100 | 73 | Petrotak 70 | 70 |
| Comp. Ex. 5 | Sumitate KF-11 | 28 | 64 | 450 | 400 | 27 | Neopolymer-E100 | 90 |

| | Paving resin composition | | | | | |
|---|---|---|---|---|---|---|
| | Petroleum type resin | | | Viscosity adjustment agent | | Symbol of |
| Examples and Comp. Examples | Melt viscosity (160° C., cps) | Amount (g) | Content (%) | Trade name | Amount (g) | Content (%) | paving resin composition |
| Ex. 1 | 200 | 750 | 50 | AROMAX-4 | 225 | 15 | A |
| Ex. 2 | 180 | 800 | 53 | Diana oil AH-24 | 150 | 10 | B |
| Ex. 3 | 200 | 675 | 45 | AROMAX-3 | 150 | 10 | C |
|  | 200 | 75 | 5 |  |  |  |  |
| Ex. 4 | 180 | 750 | 50 | AROMAX-3 | 150 | 10 | D |
| Ex. 5 | 200 | 675 | 45 | Polybutadiene R-15HT | 75 | 5 | E |
|  |  |  |  | AROMAX-3 | 150 | 10 |  |
| Ex. 6 | 700 | 750 | 50 | Epichlon 1050 | 45 | 3 | F |
|  |  |  |  | Diana oil AH-24 | 139 | 9 |  |
| Ex. 7 | 200 | 720 | 48 | Rosin | 30 | 2 | G |
|  |  |  |  | AROMAX-5 | 150 | 10 |  |
| Ex. 8 | 180 | 800 | 53 | — | — | — | H |
|  | 300 | 200 | 13 |  |  |  |  |
| Ex. 9 | 180 | 945 | 63 | — | — | — | I |
| Ex. 10 | 180 | 900 | 60 | — | — | — | J |
| Comp. Ex. 1 | 400 | 1000 | 67 | — | — | — | K |
| Comp. Ex. 2 | 1500 | 1000 | 67 | Petrothene 225 | 500 | 33 | L |
| Comp. Ex. 3 | 400 | 700 | 47 | AROMAX-3 | 195 | 13 | M |
| Comp. Ex. 4 | 180 | 400 | 27 | — | — | — | N |
| Comp. Ex. 5 | 200 | 1100 | 73 | — | — | — | O |

TABLE 2

| | Characteristics of paving resin composition | | | | | | |
|---|---|---|---|---|---|---|---|
| Examples and Comp. Examples | Form | Softening point (° C.) | Penetration degree (25° C., 1/10 mm) | Elongation (15° C., cm) | Melting property | Adhesion property | Low temperature property |
| Ex. 1 | Small lumps φ4 mm × 5 mm | 68.0 | 40 | 52 | ◯ | ◯ | ◯ |
| Ex. 2 | Small lumps φ5 mm × 10 mm | 68.5 | 45 | 44 | ◯ | ◯ | ◯ |
| Ex. 3 | Small lumps φ5 mm × 10 mm | 70.2 | 42 | 42 | ◯ | ◯ | ◯ |
| Ex. 4 | Small lumps φ4 mm × 6 mm | 60.0 | 45 | 40 | ◯ | ◯ | ◯ |
| Ex. 5 | Small lumps φ4 mm × 5 mm | 68.5 | 42 | 36 | ◯ | ◯ | ◯ |
| Ex. 6 | Small lumps φ5 mm × 8 mm | 72.0 | 41 | 35 | ◯ | ◯ | ◯ |
| Ex. 7 | Small lumps φ4 mm × 6 mm | 66.0 | 40 | 35 | ◯ | ◯ | ◯ |
| Ex. 8 | Small lumps φ6 mm × 10 mm | 60.7 | 43 | 41 | ◯ | Δ | ◯ |
| Ex. 9 | Small lumps φ6 mm × 10 mm | 53.5 | 35 | 26 | Δ | ◯ | ◯ |
| Ex. 10 | Small lumps φ5 mm × 10 mm | 75.2 | 15 | 4 | Δ | ◯ | Δ |
| Comp. Ex. 1 | Small lumps φ5 mm × 10 mm | 96.8 | 2 | 1 | X | ◯ | X |
| Comp. Ex. 2 | Small lumps φ5 mm × 10 mm | 101.5 | 0 | 0 | X | ◯ | X |
| Comp. Ex. 3 | Not formed into small lumps | | | | | | |
| Comp. Ex. 4 | Small lumps φ5 mm × 10 mm | 52.0 | 12 | 28 | X | X | ◯ |
| Comp. Ex. 5 | Small lumps φ5 mm × 10 mm | 75.2 | 2 | 2 | Δ | X | X |

EXAMPLES 11 TO 20 AND COMPARATIVE EXAMPLES 6 TO 10

The respective paving resin compositions (A) to (O) obtained in Examples 1 to 10 and Comparative Examples 1 to 5, 750 g each and various pigments 250 g each were mixed and the respective mixtures were melted at 120° C. and kneaded by a biaxial extruder and the extruded mixtures were cooled and cut into small lumps with φ4 mm×6 mm to obtain paving resin compositions.

The paving resin compositions (F), (G), (J), and (M) were used as they were, without being mixed with pigments.

Next, mixtures containing 94% of an aggregate containing 48% #6 crushed stone, 23% coarse sand and 23% fine sand, and 6% of the paving resin compositions obtained in the Examples 11 to 20 and Comparative Examples 6 to 10 were mixed at 150 to 160° C. and compacted at 130 to 140° C. to produce respective paving asphalt compositions. The number of the times of compaction was 50 times in both faces.

The properties of the obtained paving asphalt compositions are shown in Table 3.

The above-mentioned pigment-containing paving resin compositions and paving resin compositions containing no pigment were thrown directly to a mixer without passing through a measurement apparatus, so that washing of the measurement apparatus and pipes was unnecessary and thus the workability was excellent.

COMPARATIVE EXAMPLE 11

A commercialized heated asphalt resin (P) 750 g and hydrated yellow iron oxide 250 g were melted at 120° C. and kneaded by a biaxial extruder and the extruded mixture was cooled and cut into small lumps with φ4 mm×6 mm to obtain a paving resin composition. As shown in Table 3, the pigment-mixed resin composition in small lumps caused adhesion of the small lumps during storage at a room temperature and no paving asphalt composition was produced.

TABLE 3

| Examples and Comp. Examples | Paving resin composition Symbol | Amount (g) | Pigment Kind | Amount (g) | Amount (parts*) | Amount (%) | Amount of aggregate (%) | Marshall Stability Test Stability (a) (kN) | Flow value (1/100 cm) | Immersion Marshall Stability Test Stability (b) (kN) | Flow value (1/100 cm) | Residual stability (b)/(a) × 100 (%) |
|---|---|---|---|---|---|---|---|---|---|---|---|---|
| Ex. 11 | A | 750 | Red iron oxide (hematite) | 250 | 33 | 6 | 94 | 10.5 | 40 | 9.2 | 40 | 87.6 |
| Ex. 12 | B | 750 | Clay/Titanium oxide | 200/50 | 33 | 6 | 94 | 9.8 | 33 | 8.6 | 33 | 87.8 |
| Ex. 13 | C | 750 | Hydrated yellow iron oxide (goethite) | 250 | 33 | 6 | 94 | 10.2 | 37 | 9.1 | 33 | 89.2 |
| Ex. 14 | D | 750 | Clay/Yellow iron hydroxide | 50/200 | 33 | 6 | 94 | 9.6 | 33 | 8.6 | 34 | 89.6 |
| Ex. 15 | E | 750 | Clay | 250 | 33 | 6 | 94 | 9.5 | 33 | 8.6 | 33 | 90.5 |
| Ex. 16 | F | — | — | — | — | 6 | 94 | 10.8 | 41 | 9.8 | 38 | 90.7 |
| Ex. 17 | G | — | — | — | — | 6 | 94 | 9.2 | 31 | 8.1 | 32 | 88.0 |
| Ex. 18 | H | 750 | Hydrated yellow iron oxide (goethite) | 250 | 33 | 6 | 94 | 10.0 | 30 | 8.3 | 31 | 83.0 |
| Ex. 19 | I | 750 | Hydrated yellow iron oxide (goethite) | 250 | 33 | 6 | 94 | 10.6 | 31 | 8.7 | 33 | 82.1 |
| Ex. 20 | J | — | — | — | — | 6 | 94 | 7.5 | 25 | 5.7 | 23 | 76.0 |
| Comp. Ex. 6 | K | 750 | Hydrated yellow iron oxide (goethite) | 250 | 33 | 6 | 94 | 6.5 | 25 | 4.7 | 23 | 72.3 |
| Comp. Ex. 7 | L | 750 | Red iron oxide (hematite) | 250 | 33 | 6 | 94 | 3.6 | 16 | 3.2 | 11 | 88.9 |
| Comp. Ex. 8 | M | — | — | — | — | 6 | 94 | 4.5 | 20 | 3.8 | 12 | 84.4 |
| Comp. Ex. 9 | N | 750 | Red iron oxide (hemtite) | 250 | 33 | 6 | 94 | 7.5 | 22 | 6.6 | 20 | 88.0 |
| Comp. Ex. 10 | O | 750 | Hydrated yellow iron oxide (goethite) | 250 | 33 | 6 | 94 | 8.5 | 20 | 4.1 | 20 | 48.2 |
| Comp. Ex. 11 | P | 750 | Hydrated yellow iron oxide (goethite) | 250 | 33 | 6 | 94 | Small lumps adhere one another. | | | | |

*Parts based on 100 parts of thermoplastic resin composition

EXAMPLE 21

In an actual asphalt plant, a paving asphalt composition was produced in the same manner as in Example 11, except that the aggregate previously heated to 190° C. and the pigment-containing paving resin composition were mixed at 170° C. for 60 seconds in a mixer. As the aggregate used, 92% of the aggregate containing 40% #6 crushed stone, 20% #7 crushed stone, 29% coarse sand and 3% stone powder, and 8% of a pigment-containing paving resin composition were mixed to obtain a paving asphalt composition. The properties of the obtained paving asphalt composition are shown in Table 4.

The Wheel Tracking Test was carried out according to a method described in "Paving Testing Handbook", published by Japan Road Association, in November 1986. The dynamic stability (DS) measured by the Wheel Tracking Test is preferably 6,000 times/min or higher.

The color change with lapse of time was measured for respective specimens of Marshall Stability Test which were exposed outdoors for 9 months and stored in indoors. The measurement was evaluated based on the ΔE value using Color-Guide (BYK-Gardner). The ΔE is preferably 5.0 or lower.

COMPARATIVE EXAMPLE 12

A paving asphalt composition was produced in the same manner as in Example 21, except that a commercialized liquid decolored asphalt was used in place of the thermoplastic resin composition, that the composition was thrown to the mixer after having passed through a measurement apparatus, and that separately a pigment was added directly to the mixer. The properties of the obtained paving asphalt composition are shown in Table 4.

From the results in Table 4, it is made clear that the paving asphalt composition of Example 21 had ΔE value smaller than that of the composition using a conventional liquid asphalt of Comparative Example 12 and therefore the paving asphalt composition was less discolored with the lapse of time (discoloration) than the paving asphalt composition of Comparative Example 12. The paving asphalt composition of Example 21 was also found excellent in dynamic stability by the Wheel Tracking Test.

Further, since the paving asphalt composition of Example 21 was produced using the pigment-containing paving resin composition, it was not necessary to add the pigment separately to the mixer and the workability was excellent and no undesirable effect on health and work environments attributed to powder dust of the pigment was caused.

On the other hand, in Comparative Example 12, the liquid decolored asphalt was thrown to the mixer after having passed through the measurement apparatus and separately the pigment was added directly to the mixer, washing work for the measurement apparatus and pipes was needed to thus worsen the workability and the workability and working environments were deteriorated by the powder dust of the pigment.

INDUSTRIAL APPLICABILITY

The paving resin composition according to the present invention is melted within a short time, excellent in wettability and adhesion property to aggregates, and capable of providing a paved face excellent in durability free from problems of deformation during summer and cracking during winter.

Further, the paving resin composition of the present invention is formed into small lumps so as not to cause adhesion of the lumps one another during storage or transportation and sticking of the lumps to a mixer and so as to melt them within a short time, and with respect to the pigment-containing paving resin composition, it is made possible to provide a paving resin composition with good workability free from undesirable effects on health and environments attributed to powder dust at the time of feeding a pigment.

Furthermore, at the time of obtaining a paving asphalt composition by mixing the paving resin composition of the present invention and an aggregate, the paving resin composition in small lumps of the present invention can be wrapped in a poly bag, so that a prescribed amount of the composition can be thrown directly to a mixer from the wrapped state without being passed through a measurement apparatus and accordingly, washing work of the measurement apparatus or pipes is made unnecessary and the workability is thus significantly increased.

The invention claimed is:

1. A paving asphalt composition which contains:
   (a) 3 to 10% by weight of a paving resin composition which comprises a thermoplastic resin composition in small lumps of 2 to 30 mm as an average value of the maximum diameter, said thermoplastic resin composition consisting of:
   30 to 70% by weight of an ethylene-vinyl acetate copolymer having a vinyl acetate content of 20 to 45% by weight and a melting temperature of 40 to 100° C., and
   30 to 70% by weight in total of a petroleum resin and a viscosity adjustment agent in which the viscosity adjustment agent is in an amount of at highest 25% by weight of the thermoplastic resin composition; and
   (b) 97 to 90% by weight of an aggregate.

2. The paving asphalt composition of claim 1, obtained by mixing the paving resin composition and the aggregate at 150 to 200° C.

TABLE 4

| Examples and Comp. Examples | Paving asphalt composition ||||||| Marshall Stability Test || Dynamic stability by Wheel Tracking Test (DS) (Times/mm) | Change in color with lapse of time (ΔE) |
|---|---|---|---|---|---|---|---|---|---|---|---|
| | Pigment-containing paving resin composition ||||||| | | | |
| | Paving resin composition || Pigment ||| Amount of aggregate (%) | Stability (kN) | Flow value (1/100 cm) | | |
| | Symbol | Amount (g) | Kind | Amount (g) | Amount (parts*) | Amount (%) | | | | | |
| Ex. 21 | A | 750 | Red iron oxide (hematite) | 250 | 33 | 8 | 92 | 10 | 39 | 510500 | 2.8 |
| Comp. Ex. 12 | Commercialized liquid decolored asphalt | 750 | Red iron oxide (hematite) | 250 | 33 | 8 | 92 | 8 | 30 | 4100 | 7.2 |

*Parts based on 100 parts of thermoplastic resin composition

3. A method for producing a paving asphalt composition of claim 1 which comprises the steps of:
  directly throwing the paving resin composition to a mixer without passing through a measuring apparatus, and carrying out mixing with the aggregate at 150 to 200° C.

4. The method for producing a paving asphalt composition of claim 3, previously heating the aggregate at 160 to 220° C.

5. A paving asphalt composition which contains:
  (a) 3 to 10% by weight of a paving resin composition comprising a thermoplastic resin composition in small lumps of 2 to 30 mm as an average value, said thermoplastic resin composition consisting of:
    30 to 70 parts by weight of an ethylene-vinyl acetate copolymer having a vinyl acetate content of 20 to 45% by weight and a melting temperature of 40 to 100° C.,
    30 to 70 parts by weight in total of a petroleum resin and a viscosity adjustment agent in which the viscosity adjustment agent is in an amount of at highest 25 parts by weight of the thermoplastic resin composition, and 5 to 50 parts by weight of a pigment based on 100 parts by weight of the total of the ethylene-vinyl acetate copolymer, the petroleum resin, and the viscosity adjustment agent; and
  (b) 97 to 90% by weight of an aggregate.

6. The paving asphalt composition of claim 5, obtained by mixing the paving resin composition and the aggregate at 150 to 200° C.

7. A method for producing a paving asphalt composition of claim 6, which comprises the steps of:
  directly throwing the paving resin composition to a mixer without passing through a measuring apparatus, and carrying out mixing with the aggregate at 150 to 200° C.

8. The method of claim 7, previously heating the aggregate at 160 to 220° C.

9. A paving asphalt composition, consisting of:
3 to 10% by weight of a thermoplastic resin composition, said thermoplastic resin composition consisting of:
  30 to 70% by weight of an ethylene-vinyl acetate copolymer having a vinyl acetate content of 20 to 45% by weight and a melting temperature of 40 to 100° C., and
  30 to 70% by weight in total of a petroleum resin and a viscosity adjustment agent in which the viscosity adjustment agent is in an amount of at highest 25% by weight of the thermoplastic resin composition; and
97 to 90% by weight of an aggregate.

10. A paving asphalt composition, consisting of:
3 to 10% by weight of a thermoplastic resin composition, said thermoplastic resin composition consisting of:
  30 to 70 parts by weight of an ethylene-vinyl acetate copolymer having a vinyl acetate content of 20 to 45% by weight and a melting temperature of 40 to 100° C.,
  30 to 70 parts by weight in total of a petroleum resin and a viscosity adjustment agent in which the viscosity adjustment agent is in an amount of at highest 25 parts by weight of the thermoplastic resin composition, and
  5 to 50 parts by weight of a pigment based on 100 parts by weight of the total of the ethylene-vinyl acetate copolymer, the petroleum resin, and the viscosity adjustment agent; and
97 to 90% by weight of an aggregate.

\* \* \* \* \*